Dec. 21, 1954  L. LEE, II  2,697,328
SYSTEM FOR CONTROLLING GAS TEMPERATURES
Filed Oct. 6, 1950  3 Sheets-Sheet 1

Inventor
LEIGHTON LEE II
By
Lindsey and Prutzman
Attorneys

Dec. 21, 1954    L. LEE, II    2,697,328
SYSTEM FOR CONTROLLING GAS TEMPERATURES
Filed Oct. 6, 1950    3 Sheets-Sheet 2
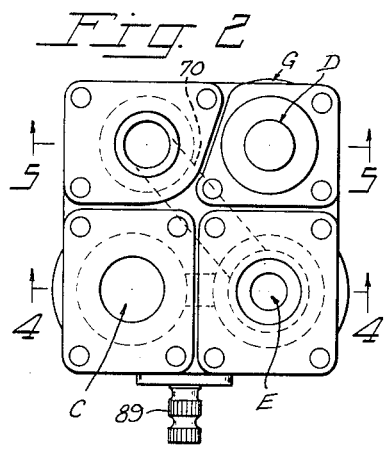
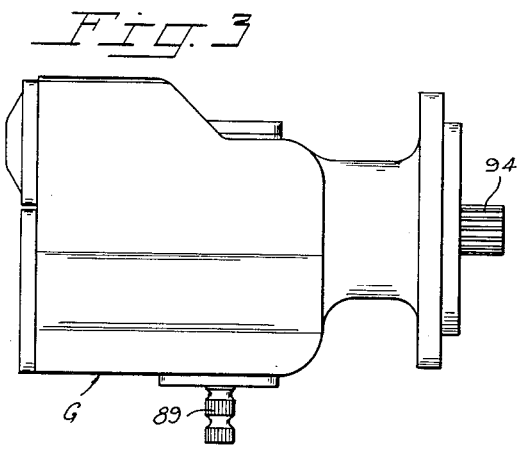
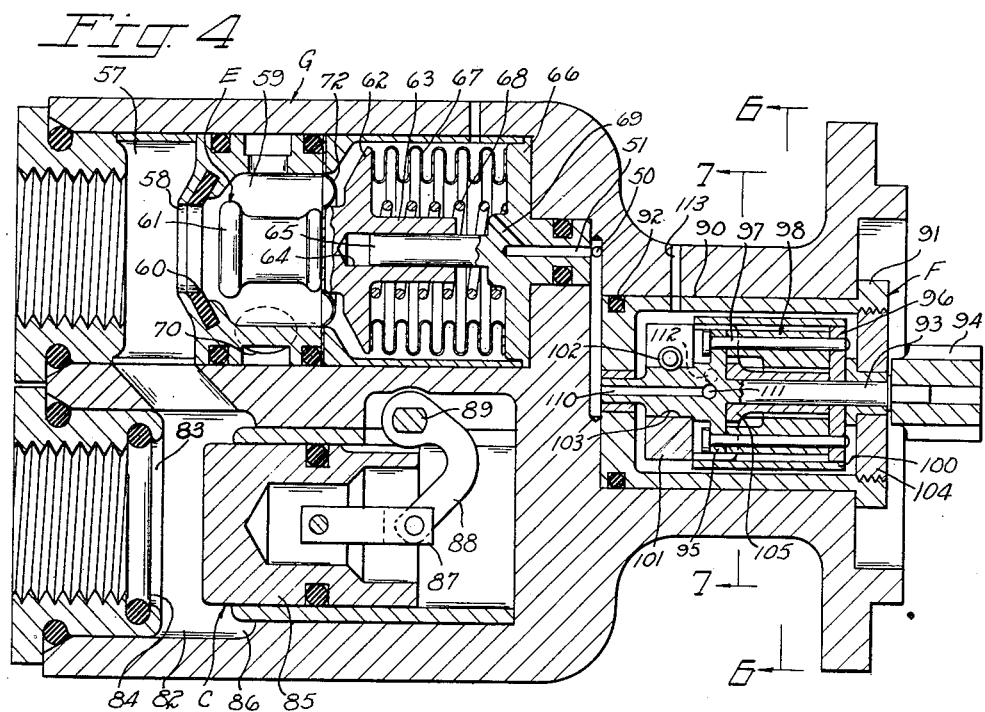
Inventor
LEIGHTON LEE II
By
Lindsey and Prutzman
Attorneys Dec. 21, 1954 L. LEE, II 2,697,328
SYSTEM FOR CONTROLLING GAS TEMPERATURES
Filed Oct. 6, 1950 3 Sheets-Sheet 3
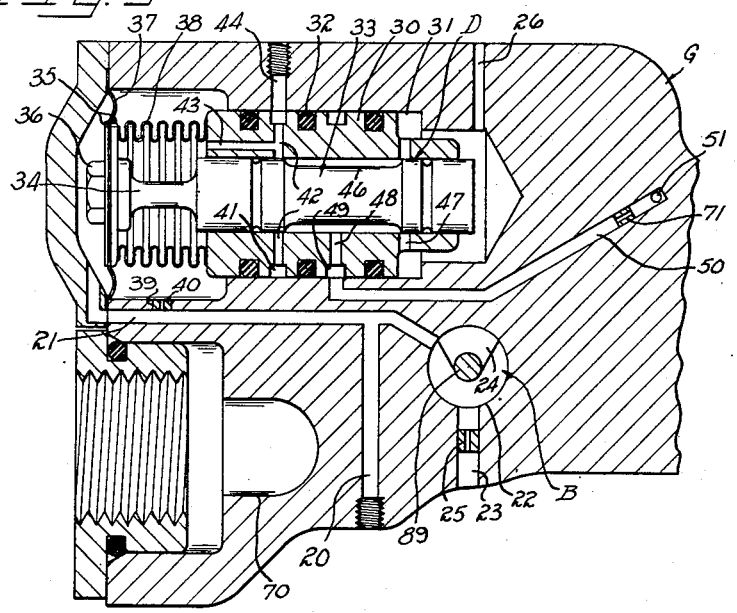
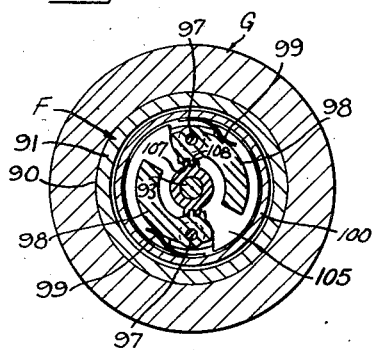
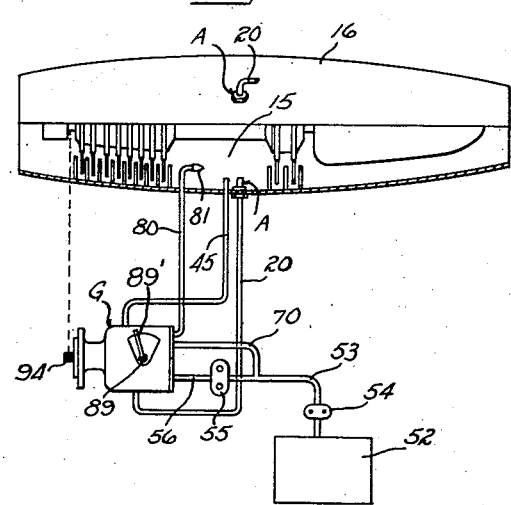
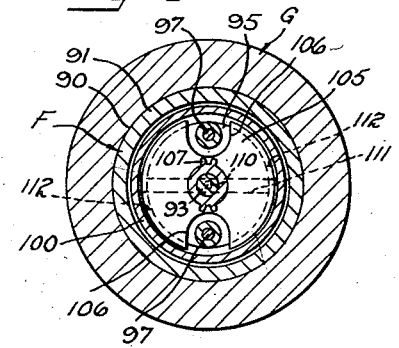
Inventor
LEIGHTON LEE II
By
Lindsey and Prutzman
Attorneys United States Patent Office 2,697,328
Patented Dec. 21, 1954

2,697,328

SYSTEM FOR CONTROLLING GAS TEMPERATURES

Leighton Lee II, Rocky Hill, Conn.

Application October 6, 1950, Serial No. 188,685

19 Claims. (Cl. 60—39.28)

The present invention relates to a control system for controlling gas temperatures, the same being responsive to the temperature of the gas and being effective to control the flow of fuel creating the heated gas. The control system of the present invention is particularly applicable for use with engines such as turbo jet engines and the like where it is desired to have a manually settable control means for varying the thrust or output of the engine. In such application, the control system of the present invention is responsive to the operating conditions of the engine, including responsiveness to engine speed if desired, to permit maximum fuel injection compatible with safe operation.

It generally is desirable to be able to operate an engine such as a turbo jet engine, or the like, at very close to the maximum speed and maximum temperature which the engine will withstand. Unfortunately the amount of fuel injection required in order to sustain substantially maximum speed and temperature under certain operating conditions normally encountered, for example in aircraft operation, will be greatly excessive and dangerous under other operating conditions which may normally occur. As a result, a control system which is entirely manual and permits sufficient fuel injection to attain maximum engine speed and temperature under all possible conditions of operation will also, of necessity, permit the operator to cause the injection of fuel to the engine to take place in excessive and dangerous amounts in some frequently encountered instances. Accordingly, there is a great need for a control system for turbo jet engines which can be used as an adjunct to a manual control permitting maximum speed and temperature under all conditions of operation and which will be responsive to operating conditions so as to monitor the action of the manual control to prevent excess and dangerous fuel injection when the operating conditions vary.

Accordingly, it is a principal object of the present invention to provide a control system for devices creating heated gases such as turbo jet engines and the like which will provide the operator with a manual control permitting maximum utilization of the engine capacity at all times, with the addition of means responsive to engine operating conditions for preventing excessive fuel injections where the operating conditions would render such excessive fuel injections dangerous.

A more particular object of the invention is to provide a control system of this type which will prevent the operation of the engine at excess speeds and excess temperatures and will prevent engine stall while giving to the operator the fullest degree of manual control compatible with the avoidance of the dangerous conditions referred to.

A further object of the invention is to provide a control system of the type referred to which can be variably set by the operator to obtain desired engine thrust and which operates by varying the fuel injection to the engine and yet which is responsive to such factors as engine temperature, altitude, air speed, and engine speed so as to prevent excessive fuel injections under varying conditions of operation.

A more specific object of the invention is to provide a control system of the character referred to above in which the power required to operate the control is derived from the compressor discharge pressure of the turbo jet engine so that no auxiliary operating means is required and so that the control is sensitive to altitude and air speed, which factors have a varying effect upon the compressor discharge pressure of the engine which, in turn, affects the amount of fuel which may be safely injected into the engine.

A more specific object of the invention is to provide a control system for a turbo jet engine in which the fuel injection to the engine is controlled throughout most of the range of operation by responsiveness to engine temperatures, but which has an overriding control responsive to engine speed to prevent operation of the engine above its rated speed. In connection with this object, it is desired to provide an overriding governor which is so designed that the effect of the governor will be modified by the rate of acceleration of the engine. Also included in this object is the aim of providing an overriding mechanical control to insure positive shutoff of the engine and preferred operation at low power ranges.

Another object of the present invention is to provide a control system for a turbo jet engine which will control the amount of fuel injected into the engine but which will operate without any appreciable pressure drop so that no increase in fuel pressure is necessitated because of the control system.

An important object of the invention is to provide a control system of the character referred to which is of universal adaptability so that it can be used with any type of turbo jet engine and with any type of fuel injection system, and wherein any adjustments required for a specific installation will be of a minor nature.

Another object of the invention is to provide a control system of the type referred to which will be simple and compact, light in weight, fool-proof in operation, and free of elements having close tolerances and which would be otherwise susceptible to breakage and malfunctioning.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 2 is an end view of a specific embodiment of the main control means of the system;

Fig. 3 is a side view of the mechanism shown in Fig. 2;

Fig. 4 is a cross sectional view taken along the line 4—4 of Fig. 2;

Fig. 5 is a cross sectional view taken along the line 5—5 of Fig. 2;

Fig. 6 is a cross sectional view taken along the line 6—6 of Fig. 4;

Fig. 7 is a cross sectional view taken along the line 7—7 of Fig. 4; and

Fig. 8 is a diagrammatic view showing the complete control system in operating relationship with a turbo jet engine and a fuel supply system.

Figure 1:
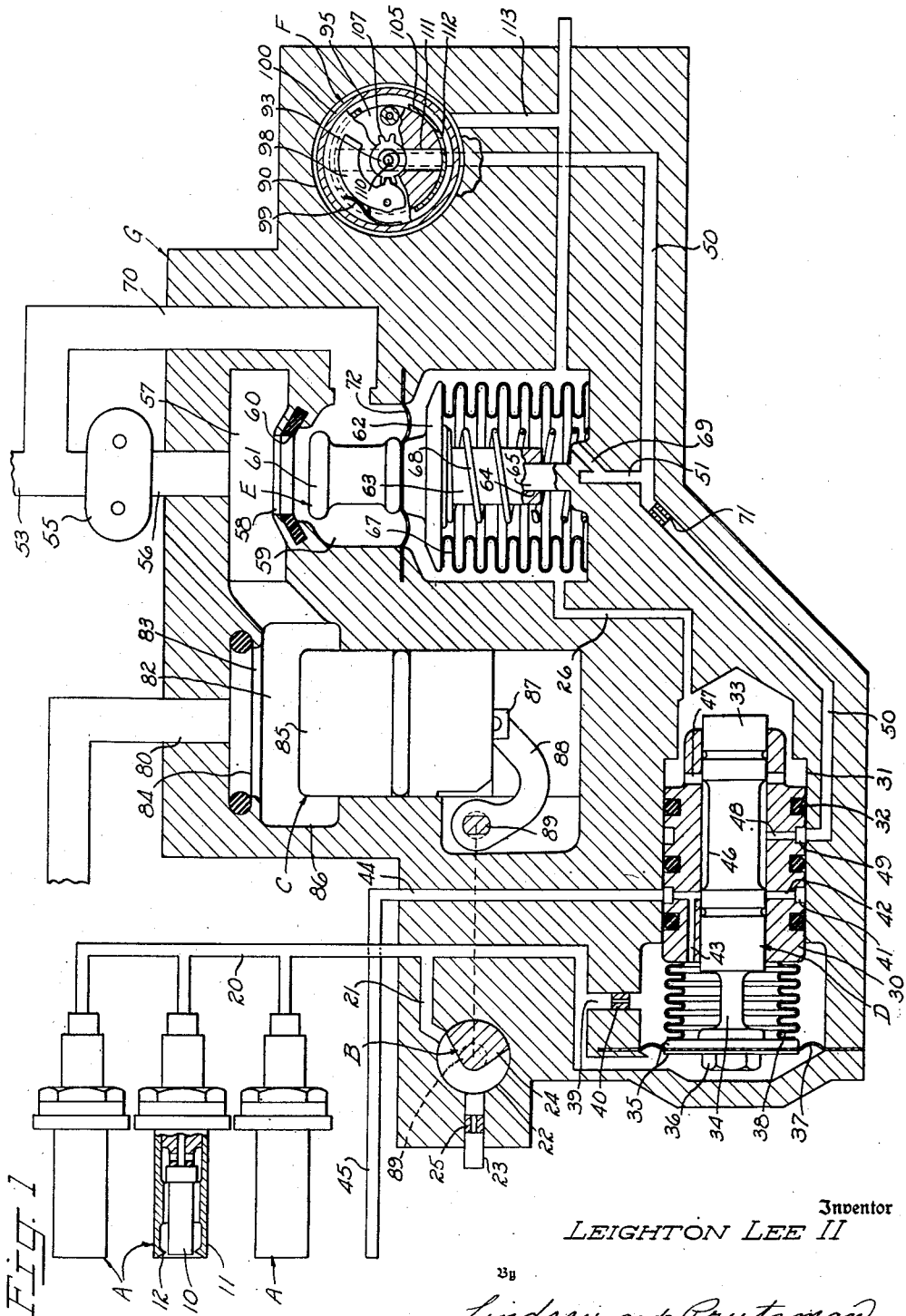
Figure 1 is a schematic view of the control system of the present invention with certain of the elements in cross section.

Referring to the specific embodiment of the invention shown in the drawings, the main elements of the control system comprise a plurality of sampling probes A, a manually controllable selector valve B and stopcock C, a temperature regulator valve D, a fuel pressure regulating valve E, and an overspeed governor F. With the exception of the sampling probes A, the entire device may be installed in a single housing G of compact size.

The construction and design of the sampling probes A is an important feature of the present invention. The sampling probes A are designed to give a variable orifice responsive to engine temperatures. As best shown in Fig. 1, a sampling probe having a variable orifice whose size is responsive to temperature may be formed by mounting a plug 10 of fixed and constant dimensions within a sleeve 11 having a predetermined coefficient of thermal expansion. As a specific example, the plug 10 may be formed as a quartz cylinder which has no appreciable dimensional change due to temperature conditions. The sleeve 11 may be a tubular piece of "nichrome" steel surrounding the plug 10. Preferably, the orifice between the plug 10 and sleeve 11 is determined by a thin outer lip 12 integral with the sleeve 11 and surrounding the external portion of the quartz plug 10. Because of the low heat mass of the temperature sensitive sleeve lip 12, there will be a very small time lag for variations in the orifice to occur in response to temperature conditions.

The sampling probes A are disposed in the fuel burning section of a turbo jet engine, as best shown in Fig. 8 of the drawings. Referring to this figure, it will be noted that sampling probes A are shown diagrammatically located in the fuel burning section 15 of a turbo jet engine 16. The control system essentially requires but a single sampling probe A. However, it is preferred to utilize a plurality of sampling probes A (shown three in Fig. 1) so as to obtain an average result showing the general temperature condition of the jet engine as distinct from what might be a purely localized temperature condition.

Inasmuch as the sampling probes A will produce a variable orifice in response to the temperature of the engine, this characteristic is employed in accordance with the invention to determine the maximum amount of fuel which can be injected into the engine. The manner in which this is accomplished will now be described.

Referring particularly to Figs. 1 and 8 of the drawings, it will be seen that the sampling probes A are connected to one end of a conduit 20 which is provided with an intermediate branch 21 extending to the manually operable selector valve B. The selector valve B in its simplest embodiment may comprise a cylindrical chamber 22 having an outlet 23 to atmosphere. Mounted within the cylindrical chamber 22 is a rotatable valve 24, which upon rotation will operate to close and open the orifice of branch conduit 21. Accordingly, the function of the temperature selector valve B is to provide a variable orifice whose size can be selected by manual adjustment of the selector valve B. As will be apparent, the pressure at the lower end of conduit 20 will be determined by the pressure existing in the burner section of the engine and the relationship of the size of the orifices of the sampling probe A and that of the selector valve B. As a specific example, if the effective size of the orifice provided by selector valve B is equal in area to the size of the orifice of sampling probe A, then the pressure at the end of the conduit 20 will be one-half of the gauge pressure of the engine burner section.

In accordance with the invention, the temperature regulator valve D is designed for responsiveness to the comparative size of the sampling probe orifice and the selector valve orifice. As best shown in Figs. 1 and 5, the temperature regulator valve D comprises a cylindrical sleeve 30 disposed in a cylindrical chamber 31 and maintained in fluid-tight relationship therewith, for example, by means of O rings 32 formed of suitable packing material. The sleeve 30 is fixed in the chamber 31 by any suitable means (not shown). Disposed within the sleeve 30 is a piston 33 which is slidable longitudinally therein and which is formed with an outwardly extending neck portion 34 on the end of which is mounted a pair of discs 35, the same being secured thereto in any suitable manner, such as by the nut 36. A diaphragm 37 is clamped between the discs 35 in fluid-tight relationship therewith, the diaphragm being secured to the periphery of the chamber 31 to form an enclosure thereacross. Extending between the disc 35 and the sleeve 30 is a flexible bellows 38 forming a fluid compartment about the neck portion 34. As best shown in Fig. 1, the lower end of the conduit 20 communicates with the lefthand extremity of the chamber 31 as viewed in this figure. A bypass 39 containing a restrictor 40 also communicates with the chamber 31 on the opposite side of the diaphragm 37, exterior of the bellows 38.

The fixed sleeve 30 is provided with an annular recess 41 communicating with a plurality of radial through bores 42 and at least one longitudinal bore 43 extending to the lefthand end of the sleeve 30, as viewed in Fig. 1, so as to communicate with the interior of the bellows 38. The annular recess 41 communicates with a passageway 44 which is connected in turn with a conduit 45, extending into the compressor discharge or burner section 15 of the jet engine.

Accordingly, it will be appreciated that compressor discharge pressure will be applied within the bellows 38 tending to move the piston 33 in a lefthand direction as viewed in Fig. 1, while a second pressure will be admitted to the left of disc 35 and diaphragm 37, tending to move the piston 33 in a righthand direction. This latter pressure is also determined by compressor discharge or burner pressure of the jet engine and the relationship of the size of the orifice of sampling probe A relative to that of temperature selector valve B. The temperature regulator valve D is designed so that it will be in equilibrium at some predetermined relationship between the size of the orifices of sampling probe A and the temperature selector valve B. As a specific example, the effective piston area at the lefthand size of the disc 35 may be made twice that of the effective area at the opposite side, which is acted upon by the pressure within the bellows 38. When so designed, the valve D will be in equilibrium when the orifice afforded by temperature selector valve B is equal to that provided by the sampling probe A. By reason of the bypass 39, equal pressure will be applied on opposite sides of the diaphragm 37 so as to cancel out the effect of the diaphragm. The restrictor 40 will provide a time lag in the event that the pressure at the lower end of a conduit 20 is increased by manually changing the setting of temperature selector valve B, or by a change in area of the sampling probe, thus giving an initial or temporary added moving force to the piston 33. This added moving force is utilized to compensate for the heat mass or time constant of the probe A.

A restrictor 25 may be inserted in the outlet 23 as a safety factor to place an upper limit on the size of the orifice which may be produced by the temperature selector valve B. If desired, means such as a conventional stop (not shown) may be provided to set a minimum limit on the extent to which the temperature selector valve B may be closed during normal operation, this in order to prevent burner blowout for lack of sufficient fuel injection.

The piston 33 has a central portion 46 of reduced diameter which, when the valve D is at equilibrium, will be disposed intermediate the radial bores 42 and other radial bores 47 which provide a vent through the sleeve 30 to the interior of the chamber 31. The chamber 31 is vented to atmosphere by a passageway 26 which for convenience is routed through chamber 59. The area defined by the reduced portion 46, however, is in constant communication with one or more intermediate radial bores 48 communicating with an annular passageway 49 in the outer surface of the sleeve 30, which in turn is connected with a passageway 50 having an intermediate branch 51 communicating through angularly related duct 69 with the fuel pressure regulating valve E.

As will be apparent, the arrangement and construction of the temperature regulator valve D is such that, when the piston 33 is moved to the left, as viewed in Fig. 1, compressor discharge or burner pressure will be admitted to the regulating valve E. Conversely, when the piston 33 is moved in a righthand direction, the fuel pressure regulating valve E is vented. A restrictor 71 may be employed in passageway 50 to resist quick changes in pressure of valve D.

The function of the fuel pressure regulating valve E is to vary the pressure at which the fuel is supplied to the engine, it being realized that suitable flow dividers and/or nozzles will be designed to maintain a desired flow of fuel versus fuel pressure whereby changes in fuel pressure will result in desired changes in the amount of fuel injected. As illustrated diagrammatically in Fig. 8 of the drawings, the fuel may be supplied from a suitable tank or reservoir 52 through a conduit 53 by means of a suitable booster pump 54. The fuel introduced through conduit 53 is then acted upon by the main fuel pump 55 which is connected by conduit 56 to a passageway 57 in the housing G, as best shown in Figs. 1 and 4 of the drawings.

Communicating with the passageway 57 is an opening 58 to the chamber 59 of the pressure regulating valve E. The opening 58 is formed with a valve seat 60 with which a valve 61 is adapted to cooperate. The valve 61 is mounted on the top of a cylindrical cap 62 having a central boss 63 which is bored at 64 so that the same may seat slidably upon a guide post 65 having a base 66 which is seated in the opposite end of the chamber 59. A bellows 67 extends between the base 66 and the cap 62. A spring 68 may be provided interiorly of the bellows 67 to overcome the weight of the valve and to prevent collapse of the bellows 67 when the interior pressure is relieved. As indicated in the drawings, the angularly related passageway 69 extending from the branch 51 communicates with the space interior of the bellows 67.

As best shown in Fig. 1 of the drawings, the portion of the chamber 59 adjacent the valve seat 60 is in communication with a bypass conduit 70 which returns to the conduit 53 intermediate the booster pump 54 and main fuel pump 55. Accordingly, when the valve 61 is in seated position on the valve seat 60, the entire fuel pressure is available for fuel injection purposes; but, when the valve 61 is unseated, a portion of the fuel is bypassed around the fuel pump, thereby decreasing the fuel pressure. The design of the valve 61 is such that the pressure in passageway 57 required to unseat the valve 61 preferably is twice the pressure impressed upon the bellows 67. Accordingly, with such an arrangement, the fuel pressure can never exceed twice the compressor discharge or burner pressure, which is of importance to prevent compressor stall during rapid acceleration or quick change of engine speed.

As shown in Figs. 1 and 4 of the drawings, there is provided a diaphragm 72 extending between the cap 62 and the periphery of the chamber 59. The diaphragm 72 preferably has an area equal to the area of the valve 61 so that the effect of the booster pump 54 is cancelled out and has no effect upon the operation of the valve. Accordingly, the control system may be employed in any type of installation without requiring redesign because of differences in the types of booster pumps employed.

The passageway 57 communicates by way of stopcock C and conduit 80 with the fuel injector 81 of the engine. The stopcock C comprises a generally cylindrical chamber 82 having an opening 83 communicating with the conduit 80 and formed with a valve seat 84. A generally cylindrical valve plunger 85 is slidably mounted in the chamber for seating upon the valve seat 84. The chamber 82 is enlarged at 86 where it communicates with the chamber 57 so that the valve plunger 85 has no appreciable effect upon the flow of fuel except when in seated position or immediately prior thereto. The valve plunger 85 is adapted to be operated by a link 87 and crankarm 88, which is fixed to a shaft 89 of the temperature selector valve B. It is intended that the shaft 89 will be turned by the operator through any suitable control means such as lever 89' for the purpose of setting the selector valve B and also operating the stopcock C. The arrangement is such that the stopcock C will not be effective except when the selector valve B is turned to substantially fully closed position.

To assist in the understanding of the invention, the following is an explanation of the operation of the control system as thus far described. When the operator of the turbo jet engine, such as the pilot of an aircraft in which the turbo jet engine is installed, wishes to vary the power output of the engine, he accomplishes this merely by turning the shaft 89 to vary the orifice provided by the temperature selector valve B. If the shaft 89 is turned in such direction that the orifice is increased, then the resulting pressure applied to the outer faces of the discs 35 of the temperature regulator valve D is decreased, permitting the piston 33 to move to the left, as viewed in the drawings. This causes compressor discharge or burner pressure to be applied through the temperature regulator valve D to the bellows 67 of the regulating valve E. The resulting increase in pressure within the bellows 67 causes the valve 61 to move in a closing direction, thus decreasing the flow of fuel through the bypass 70, thus increasing the pressure available for fuel injection. The resulting increase in fuel injection will result in an increase in the temperature within the engine. The increase in engine temperature will of course increase the orifice of the sampling probes A, as explained above. Assuming that the temperature regulator valve D has been arranged for operating at equilibrium when the pressures are in a two to one ratio as mentioned in the specific example above, the increased fuel injection will be permitted to continue until the average effective orifice of the sampling probes A has increased so as to equal that of the effective orifice for which selector valve B has been set. In other words, when a temperature has been reached sufficient to increase the effective orifice of sampling probes A to the extent stated, the regulator valve D will be in equilibrium and no further pressure will be admitted to the bellows 67 of the regulating valve D. Under these conditions, engine speed will accelerate but since there is no further increase in the rate of fuel injection, the increase in engine speed will result in a lowering of the engine temperature. Accordingly, the effective orifice of the sampling probes A will again be decreased, resulting in the admission of further pressure to the bellows 67, thereby further increasing the fuel injection pressure. This sequence continues until the system reaches equilibrium, i. e. until there is no further increase in engine speed causing a lowering of engine temperature. The result is therefore that the engine will reach the speed and hence power output desired by the operator through his setting of the selector valve B without any possibility of the engine temperature exceeding a safe value for the engine.

In the event that the operator wishes to decrease the output or thrust of the engine, the opposite procedure is followed. In other words, the operator will turn the shaft 89 in order to decrease the effective relief orifice of the selector valve B, which will increase the pressure on the outer end of the discs 35, thus moving the piston 33 to the right, causing the bellows 67 to be exhausted to atmosphere. The resulting drop in the pressure within the bellows 67 permits the valve 61 to move away from the valve seat 60, thereby decreasing the pressure of the fuel for injection purposes. The resulting drop in fuel injection will cause a decrease in engine temperature which, in turn, decreases the effective orifice of the sampling probes A. This condition will prevail until the engine temperature has been reduced to such an extent that the average effective orifice of sampling probes A becomes equal to that of the effective orifice of selector valve B as determined by the operator. When this condition results, the temperature regulator valve D is again in equilibrium, thus maintaining the fuel injection pressure at a desired constant.

Inasmuch as the operating force for the regulating valve E is compressor discharge or burner pressure of the turbo jet engine, it will be realized that the control system will be responsive to altitude and engine speed since both of these factors will vary the amount of air received in the turbo jet engine and thus the pressure within the engine. In general, the maximum amount of fuel injection permitted will decrease with the amount of air intake, or vice versa.

In order to prevent the operation of the turbo jet engine at speeds in excess of the safe maximum speed for the turbo jet engine, the control system is provided in accordance with the invention with an overspeed governor F. The overspeed governor F is mounted within a cylindrical chamber 90 at one end of the housing G and includes a cylindrical casing 91 which is inserted in the chamber 90 and sealed therewith such as by means of the O ring 92. Extending axially of the casing 91 is a rotatable shaft 93 journaled in opposite ends of the casing. The righthand end of the shaft 93, as viewed in Figs. 3 and 4 of the drawings, is provided with a pinion 94 which may be geared in any suitable manner indicated by broken lines in Figure 8 with the rotor of the turbo jet engine for rotation therewith.

The shaft 93 is formed with an integral annular shoulder 95 intermediate the ends thereof and also has fixed thereto a circular plate 96. Extending between the shoulder 95 and plate 96 are a pair of oppositely spaced, longitudinally extending pivot pins 97. Pivotally mounted on the pivot pins 97 are a pair of weights 98, the weights 98 being generally arcuate in cross section and being journaled adjacent one edge of the pivot pins 97 so that the free ends thereof are free to move radially outwardly due to centrifugal force when the shaft 93 is rotated.

The weights 98 are urged inwardly by means of leaf springs 99 having one edge engaging against the periphery of the weights 98 and secured at their other end to a cylinder 100. The cylinder 100 is mounted on a disc 101 which is connected to the shaft 93 by means of a worm 102 journaled in the disc 101 and engaging teeth 103 formed in the adjacent portion of the shaft 93. By adjusting the position of the cylinder 100 relative to the shaft 93 by turning the worm 102, the points at which the springs 99 engage against the weights 98 may be varied, thereby varying the centrifugal force and hence the speed of rotation of the shaft 93 required to pivot the weights 98 outwardly of the governor. Access may be had to worm 102 for making this adjustment by unscrewing the cover 104 from casing 91 and removing the governor mechanism from the casing.

Mounted on the shaft 93 is a cup-shaped valve 105 surrounding the annular shoulder 95. The cup-shaped valve 105 is notched at 106, as best shown in Fig. 7 of the drawings, to accommodate the pivot pins 97 and to permit relative rotational movement of the valve 105 with respect to the annular shoulder 95. The valve 105 is provided with teeth 107 which are engaged by teeth 108 formed on the weights 98. Accordingly, as the weights are pivoted outwardly, they tend to retard the vadve 105 relative to the shaft 93 and, conversely, when the weights 98 are moved inwardly of the governor under the influence of springs 99, the valve 105 is advanced relative to the shaft 93.

The inner end of the shaft 93 is provided with an axial bore 110 which communicates with a transverse bore 111 in the annular shoulder 95. The cup-shaped valve 105 is provided with ports 112 which are adapted to be moved into and out of register with the bore 111 as the cup-shaped valve 105 is rotated relative to the shaft 93.

As best shown in Figs. 1 and 4 of the drawings, the passageway 50 communicates with the axial bore 110 of shaft 93. Accordingly, when the engine speed has been increased to the maximum permitted, the weights 98 will turn the cup-shaped valve 105 relative to the shaft 93 and hence the shoulder 95 so as to vent the transverse bore 111 and hence the axial bore 110 to the interior of the cylindrical casing 91 through ports 112. The cylindrical casing 91, in turn, is vented to atmosphere through a passageway 113. As a result, the attainment of maximum speed for the engine will result in the venting of the bellows 67 of the regulating valve E so as to cause an increase in the bypassage of fuel and thus a decrease in fuel injection pressure.

It is a particular advantage of a governor constructed in accordance with the present invention, as described above, that it will be responsive to the rate of acceleration of the engine and will cause the release of pressure to occur at engine speeds which are lower when the rate of acceleration is increased. Inasmuch as the cup-shaped valve 105 is free to turn relative to the shaft 93 and has sufficient mass so as to have appreciable inertia, it will be apparent that, when the shaft 93 is accelerated, the cup-shaped valve 105 will tend to move in retard of the shaft 93 and thus open the passageway through the ports 112 at a lower speed, there being less force required to move the valve 105 through the weights 98. Accordingly, when the engine is accelerated, the cutoff produced by the governor F will occur at less than maximum speed so that in the final stage of operation, the engine will attain the desired speed without overshooting. The greater the rate of acceleration, the lower the cutoff speed so that the tendency of the engine to overshoot the governor speed, which will vary with the rate of acceleration, will be corrected. Without this modification, the engine would overshoot the maximum speed and then, in slowing down, would undershoot the maximum speed limit with the result that a bucking or pulsating effect would result. By the use of a governor constructed in accordance with the invention, such a bucking or pulsating effect is entirely avoided and the governor control will permit a gradual approach to a stabilized speed.

It thus will be seen that there has been provided, in accordance with the invention, a novel control system for a turbo jet engine which will provide all of the necessary control and safety features required for safe operation of the engine without curtailing the maximum utility of the engine as conditions permit. The control is compact in size, has no close sliding fits in the portions controlling fuel flow which might otherwise be deleteriously affected by dirty or contaminated fuel, and in general, will perform satisfactorily over long periods of time without danger of failure or damage. The control operates without any appreciable pressure drop in the fuel supply line and, therefore, places no burden on the fuel supply system. The control is operated by fluid pressure which, due to the compressibility of gases, tends to dampen abrupt changes in the system, thereby avoiding erratic operation, and the fluid pressure is automatically responsive to altitude.

This means that the sensitivity of both the speed governing unit and the temperature controlling unit is modified in proportion to the rate of air flow through the engine, without employing any device or measurement to accomplish this result. The control system insures that there will be no fuel injection in excess of that permitted by engine speed and temperature conditions at all times.

While the system of the present invention has been particularly described in connection with a turbo jet engine, this has been done merely for simplicity and clarity of presentation, and it will be apparent to one skilled in the art that the system of the present invention is applicable broadly to other types of mechanisms or engines which operate by the production of heated gases from fuel and where it is desired to permit maximum utilization of the capacity of the mechanism or engine compatible with safe operation, particularly in respect to temperature of the heated gases produced.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein descrioed and all statements of the scope of the invention which, as a matter of language, might be said to fall therebetween.

I claim as my invention:

1. A control system for controlling gas temperatures for use with a mechanism producing hot combustion gases from fuel comprising means disposed in said mechanism in contact with said hot combustion gases having a variable effective orifice responsive to gas temperature, manually operable means providing a variable effective orifice, means for controlling the injection of fuel to the mechanism, and means for actuating the last-named means responsive to the relative sizes of said effective orifices.

2. A control system for controlling gas temperatures for use with a mechanism producing hot combustion gases from fuel comprising means disposed in said mechanism in contact with said hot combustion gases having a variable effective orifice responsive to gas temperature, manually operable means providing a variable effective orifice, fluid pressure operated means for controlling the injection of fuel to the mechanism, and means for applying fluid pressure to said last-named means responsive to the relative sizes of said effective orifices.

3. A control system for controlling gas temperatures for use with a mechanism having a burner section for producing hot combustion gases from fuel comprising means communicating with the burner section of the mechanism and having a variable effective orifice responsive to the gas temperature, manually operable valve means providing a manually variable effective orifice open to atmosphere, means for controlling the injection of fuel to the mechanism, fluid pressure responsive means for operating the last-named means, and means communicating with said variable effective orifices for applying fluid pressure to said fluid pressure responsive means responsive to the relationship of the size of said effective orifices.

4. A control system for an engine producing hot gases from fuel comprising means disposed in said engine in contact with the hot gases having a variable effective orifice responsive to the gas temperature, manually operable means providing a manually variable effective orifice, means for controlling the injection of fuel to the engine, means for actuating the controlling means responsive to the relative sizes of said effective orifices, and speed responsive means for rendering the last-named means inoperable at high engine speeds.

5. A control system for an engine producing hot gases from fuel comprising means disposed in said engine in contact with the hot gases having a variable effective orifice responsive to the temperature of the hot gases produced by the engine, manually operable means providing a manually variable effective orifice, fluid operated means for controlling the injection of fuel to the engine, means for supplying fluid under pressure to the fluid operated means responsive to the relative sizes of said effective orifices, and speed responsive means for venting the fluid operated means at high engine speeds.

6. A control system for an engine producing hot gases from fuel comprising means disposed in said engine in contact with the hot gases having a variable effective orifice responsive to the temperature of the hot gases produced by the engine, manually operable means providing a manually variable effective orifice, means for controlling the injection of fuel to the engine, means for actuating the controlling means responsive to the relative sizes of said effective orifices, and speed responsive means for rendering the last-named means inoperable at a predetermined engine speed provided with means responsive to acceleration of the engine for varying said predetermined engine speed.

7. A control system for engines having a fuel burning section comprising means communicating with the burner section of the engine and having a variable effective orifice responsive to the temperature thereof, manually operable valve means providing a manually variable effective orifice open to atmosphere, means for controlling the injection of fuel to the engine, fluid responsive means for operating the last-named means, and means for admitting gas under pressure from the engine to said fluid responsive means including a valve movable in response to the relationship of the size of said effective orifices.

8. A control system for jet type engines having a fuel burning section comprising means communicating with the burner section of the engine and having a variable effective orifice responsive to engine temperature, manually operable valve means providing a manually variable effective orifice open to atmosphere, means for controlling the injection of fuel to the engine, fluid pressure responsive means for operating the last-named means, means providing a first passageway to the engine, means providing a second passageway to the fluid pressure responsive means, and a valve between said passageways responsive to the relationship of the size of said effective orifices having a first position establishing communication between the passageways and a second position for venting the second passageway to atmosphere.

9. A control system for engines having a burner section such as turbo jet engines, and the like, comprising means communicating with the burner section of the engine and having a variable effective orifice responsive to engine temperature, manually operable valve means providing a manually variable effective orifice open to atmosphere, means for controlling the injection of fuel to the engine, fluid responsive means for operating the last-named means, means for admitting fluid under pressure from the burner section of the engine to the fluid responsive means, means responsive to the relationship of the size of said effective orifices for controlling the admission of said fluid under pressure to the fluid responsive means, and speed responsive means for venting the fluid responsive means at high engine speeds.

10. In a control system for engines having a burner section such as turbo jet engines, and the like, means for regulating the flow of fuel to the engine, means for actuating the regulating means including a member movably mounted in a fluid chamber, means for applying fluid pressure to the member comprising a passageway extending between the chamber and the burner section of the engine, means in the burner section forming a variable effective orifice between the burner section and the passageway responsive to engine temperature, and manually operable valve means communicating with the passageway intermediate its ends and providing a manually adjustable orifice venting to atmosphere.

11. A control system for engines such as turbo jet engines, and the like, comprising means for regulating the flow of fuel to the engine, means for actuating the regulating means including a member movably mounted in a fluid chamber, means for applying fluid pressure to move the member in one direction comprising means forming a passageway between the chamber and the burner section of the engine, and means for applying the fluid pressure to move the member in the opposite direction comprising means forming a second passageway between the chamber and the burner section of the engine, means in the burner section forming a variable inlet orifice for said second passageway responsive to engine temperature, and manually operable valve means communicating with the second passageway intermediate its ends and providing a manually adjustable orifice venting to atmosphere.

12. A control system for a turbo jet engine comprising means for varying the flow of fuel to the engine, fluid pressure responsive means for controlling the last-named means, means including a fluid passageway for supplying fluid under pressure to said fluid pressure responsive means, fluid pressure operated valve means in said passageway movable in one direction to open the passageway and movable in a second direction to vent the fluid pressure responsive means to atmosphere, means for applying fluid pressure to said valve means to move the valve means in said one direction comprising a fluid passageway between the valve means and the burner section of the engine, and means for applying fluid pressure to said valve means to move the valve means in said second direction comprising a second fluid passageway between the valve means and the burner section of the engine, means in the burner section forming a variable inlet orifice for said second passageway responsive to engine temperature, and manually operable valve means communicating with the second passageway intermediate its ends and providing a manually adjustable orifice venting to atmosphere.

13. In a control system for a turbo jet engine, means for varying the flow of fuel to the engine, and fluid pressure responsive means for controlling the last-named means including a piston having opposed surfaces movably mounted in a chamber, means for applying fluid pressure to one opposed surface comprising a first fluid passageway extending between the chamber and the burner section of the engine, and means for applying fluid pressure to the other opposed surface comprising a second fluid passageway extending between the chamber and the burner section of the engine, means in the burner section forming a variable inlet orifice for said second passageway responsive to engine temperature, and manually operable valve means communicating with the second passageway intermediate its ends and providing a manually adjustable orifice venting to atmosphere, said opposed surfaces of the piston being proportioned to place the piston in equilibrium when said orifices have a predetermined relative size.

14. In a control system for a turbo jet engine, means forming a chamber, a member movably mounted in the chamber having opposed surfaces, means for admitting fluid under pressure to said chamber adjacent one of said opposed surfaces comprising a passageway extending to the burner section of the engine, and means for admitting fluid under pressure to said chamber adjacent the other opposed surface comprising a second passageway extending to the burner section of the engine and provided with means forming a variable inlet orifice responsive to engine temperature, and manually operable outlet valve intermediate the ends of the second passageway providing a variable venting orifice, said valve being in equilibrium when the ratio of the size of said orifices corresponds to the predetermined ratio of the areas of said surfaces.

15. A control system for a turbo jet engine comprising means for varying the flow of fuel to the engine, fluid pressure responsive means for controlling the last-named means, a valve communicating with the fluid responsive means having a passageway to the burner section of the engine and a venting passageway, said valve being movable in one direction from an intermediate position to admit fluid from the passageway to the fluid responsive means and in the opposite direction to vent the fluid responsive means to atmosphere, and means for operating the valve comprising a movable member having opposed surfaces, means comprising a passageway for applying fluid under pressure from the engine to one opposed surface to move the valve in said one direction, and means for applying fluid under pressure from the engine to the other opposed surface to move the valve in the opposite direction comprising a passageway having a manually variable outlet orifice intermediate its ends and an inlet orifice responsve to engine temperature, said opposed surfaces being of such size as to hold the valve in equilibrium in said intermediate position when said orifices have a predetermined relative size.

16. A control system for a turbo jet engine comprising a fuel supply line, a bypass communicating with the supply line, a valve for regulating the flow of fuel through the bypass, pressure responsive means for positioning the valve including a fluid chamber, means including a fluid passageway for supplying fluid under pressure from the engine to said chamber, valve means in said passageway movable in one direction to open the passageway and movable in a second direction to vent the chamber to atmosphere, means for operating the last-named valve means including a member having opposed surfaces, means including a first passageway for applying fluid under pressure from the engine to one of said opposed surfaces, and means for applying fluid under pressure from the engine to the other opposed surface including a second passageway provided with inlet means having an effective orifice whose size varies in response to engine temperature and an outlet intermediate the ends of the second passageway having a manually variable orifice.

17. A control system for a turbo jet engine comprising a fuel supply line, a bypass communicating with the supply line, a valve for regulating the flow of fuel through the bypass, pressure responsive means for positioning the valve including a fluid chamber, means including a fluid passageway for supplying fluid under pressure from the engine to said chamber, valve means in said passageway movable in one direction to open the passageway and movable in a second direction to vent the chamber to atmosphere, means for operating the last-named valve means including a member having opposed surfaces, means including a first passageway for applying fluid under pressure from the engine to one of said opposed surfaces, means for applying fluid under pressure from the engine to the other opposed surface including a second passageway provided with inlet means having an effective orifice whose size varies in response to engine temperature and an outlet intermediate the ends of the second passageway having a manually variable orifice, and means responsive to engine speed for venting the said fluid chamber at high engine speeds.

18. A control system for a turbo jet engine comprising a supply line for fuel under pressure, a bypass having an opening communicating with the supply line, a valve mounted for movement toward and away from the opening to vary the effective fuel pressure in the supply line, means for controlling the valve including a chamber and a piston movably mounted in the chamber, means forming a fluid passageway between the burner section of the engine and said chamber, a valve in said passageway including a chamber and a member movably mounted in the chamber provided with means for alternately closing the passageway and venting the chamber to atmosphere, said member having oppositely facing surfaces, means forming a first fluid passageway between the burner section of the engine and the last-named chamber adjacent one of said surfaces, means forming a second fluid passageway between the burner section of the engine and the last-named chamber adjacent the other of said surfaces, said second passageway being provided with an inlet disposed in the burner section of the engine having a variable effective orifice responsive to engine temperatures and an intermediate outlet having a manually variable venting orifice, said oppositely facing surfaces being proportioned to place the valve in said passageway in equilibrium when said orifices have a predetermined relative size, and a fluid release valve communicating with the first-named chamber comprising a shaft adapted to be driven by the engine, a fluid release passageway extending through the shaft and having an outlet port, a valve member rotatably mounted coaxially with the shaft and adapted to open the port when moved in retard of the shaft, a pivotally mounted weight supported by the shaft, a driving connection between the weight and the valve member to move the valve member in retard of the shaft when the weight is pivoted by centrifugal force, and means biasing the weight and valve member to closed port position.

19. A control system for a turbo jet engine comprising a supply line for fuel under pressure, a bypass having an opening communicating with the supply line, a regulating valve mounted for movement toward and from said opening to vary the effective fuel pressure in the supply line, means for controlling the regulating valve including a chamber, a piston movable therein, means defining a fluid passageway between the burner section of the engine and said chamber, valve means in said passageway for alternately closing the passageway and venting the chamber to atmosphere, said valve means including a movable member with oppositely facing surfaces, means defining a first fluid passageway between the burner section of the engine and said valve means adjacent one of said surfaces, means defining a second fluid passageway between the burner section of the engine and said valve, means adjacent the other of said surfaces, the end of said second passageway adjacent the burner section of the engine being provided with a probe adapted to be inserted in the burner section and having a valve orifice responsive to engine temperatures comprising a cylindrical bore formed of material having substantially constant dimensions at varying temperatures and a cylinder surrounding the bore and being formed of a material having a predetermined temperature coefficient of expansion, said second passageway also having an intermediate outlet provided with a manually variable venting orifice, said oppositely facing surfaces being proportioned to place the movable member in said valve means in equilibrium when said orifices have a predetermined relative size, and a fluid release valve communicating with said chamber comprising a shaft adapted to be driven by the engine, a fluid release passageway extending through the shaft and having an outlet port, a valve member rotatably mounted co-axially with the shaft and adapted to open the port when moved in retard of the shaft, a pivotally mounted weight supported by the shaft, a driving connection between the weight and the valve member to move the valve member in retard of the shaft when the weight is pivoted by centrifugal force, and means biasing the weight and valve member to closed port position.

References Cited in the file of this patent

UNITED STATES PATENTS

| Number | Name | Date |
| --- | --- | --- |
| 1,810,059 | Robertson | June 16, 1931 |
| 1,871,287 | Whittaker | Aug. 9, 1932 |
| 2,167,590 | Slaughenhop | July 25, 1939 |
| 2,219,994 | Jung | Oct. 29, 1940 |
| 2,306,953 | Jung | Dec. 29, 1942 |
| 2,405,888 | Holley | Aug. 13, 1946 |
| 2,414,322 | Mock | Jan. 14, 1947 |
| 2,421,713 | Porter | June 3, 1947 |
| 2,508,260 | Holley | May 16, 1950 |
| 2,606,420 | Moore, Jr. | Aug. 12, 1952 |

FOREIGN PATENTS

| Number | Country | Date |
| --- | --- | --- |
| 605,093 | Great Britain | July 15, 1948 |